July 22, 1952  E. L. ALLEN  2,603,963
LATCH ACTUATING AND LOCKING MECHANISM
Filed March 5, 1948  6 Sheets-Sheet 1

INVENTOR.
EDWIN L. ALLEN
BY
Bosworth & Sessions
ATTORNEYS

INVENTOR.
EDWIN L. ALLEN
BY
Bosworth & Sessions
ATTORNEYS

July 22, 1952　　　　　E. L. ALLEN　　　　　2,603,963
LATCH ACTUATING AND LOCKING MECHANISM
Filed March 5, 1948　　　　　　　　　　　6 Sheets-Sheet 3

INVENTOR.
EDWIN L. ALLEN
BY
Bosworth & Sessions
ATTORNEYS

INVENTOR.
EDWIN L. ALLEN
BY
Bosworth & Sessions
ATTORNEYS

July 22, 1952 E. L. ALLEN 2,603,963
LATCH ACTUATING AND LOCKING MECHANISM
Filed March 5, 1948 6 Sheets-Sheet 5

INVENTOR.
EDWIN L. ALLEN
BY
Bosworth & Sessions
ATTORNEYS

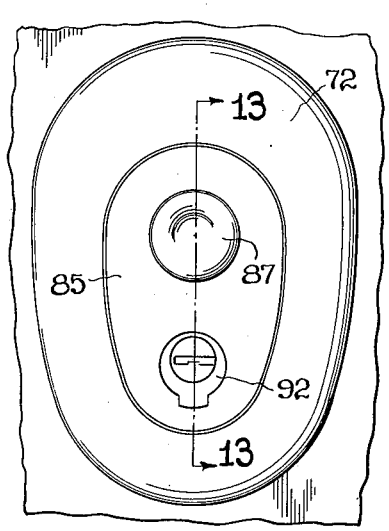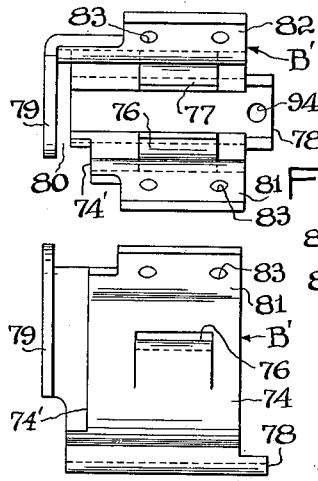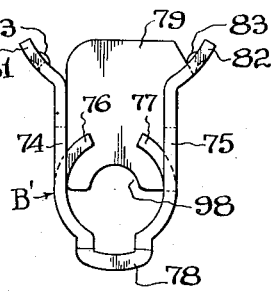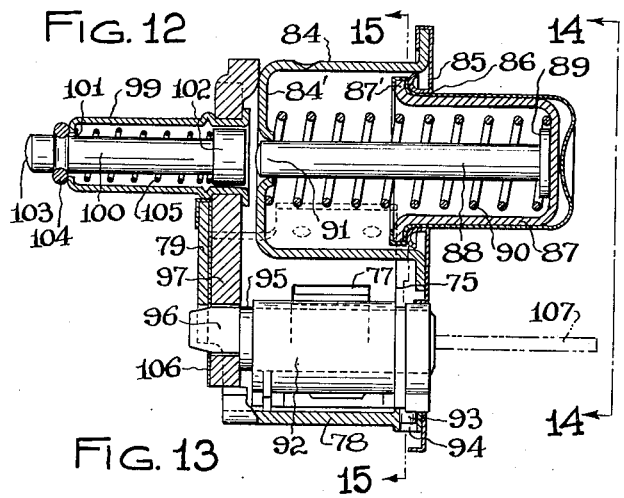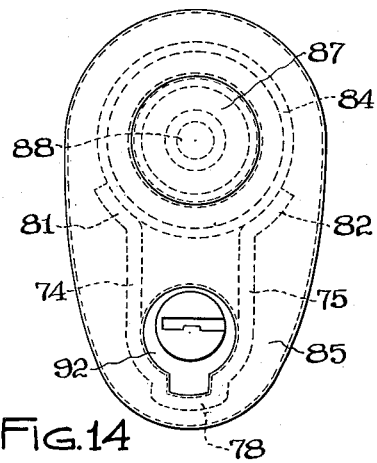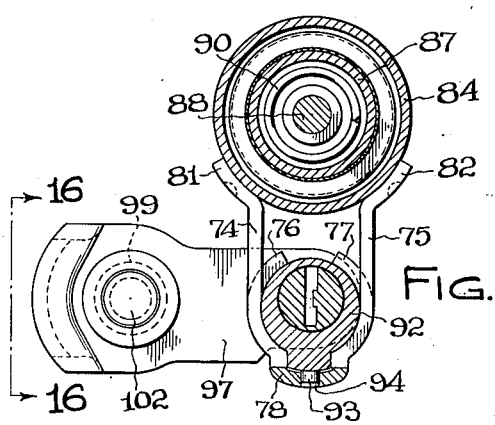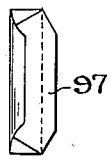

Patented July 22, 1952

2,603,963

UNITED STATES PATENT OFFICE 2,603,963

LATCH ACTUATING AND LOCKING MECHANISM

Edwin L. Allen, Cleveland Heights, Ohio, assignor, by mesne assignments, to Rudolph I. Schonitzer, Cleveland, Ohio Application March 5, 1948, Serial No. 13,153

9 Claims. (Cl. 70—266)

1

This invention relates to control apparatus for latch mechanisms and more particularly to an improved latch actuating and locking mechanism for closure members such as automotive vehicle doors, rear deck lids, and the like.

In my copending United States patent applications Serial No. 713,220, filed November 30, 1946 and 723,330, filed January 21, 1947, now Patent No. 2,587,583, I have described and claimed certain improvements in door control apparatus wherein a manually operable element, such as a push button or handle, is so arranged that when the mechanism is locked to prevent unauthorized opening of the door the manually operable element may be given idling movement in its normal latch releasing path without releasing the latch mechanism. This arrangement is desirable as it provides an effective locking means and also prevents damage due to the exertion of excessive force on the manually operable handle or push button when the latch mechanism is locked. The present invention relates to improvements in door latch actuating and locking mechanisms of the idling push button type embodying some of the features of my said copending United States patent applications and cross-reference is accordingly made thereto. It will be understood that although I have illustrated herein a push button which is manually moved by the operator to effect release of the latch, other manually operable members, such as handles or levers might be employed. Accordingly where the term "push button" is employed herein it is intended to include manually operable handles, levers, and the like, as well as push buttons proper.

Among the objects of my present invention are: the provision of a door latch actuating and locking mechanism in the form of a unitary assembly which is compact and rugged and which may readily be installed on a closure member; the provision of an idling type latch actuating and locking mechanism particularly adapted for use for controlling the actuation of the latch mechanism of an automobile rear deck lid or the like; the provision of a deck lid latch actuating and locking device in which a manually operable push button is employed and in which a key controlled lock is adapted to determine whether the push button has latch actuating movement or idling movement; the provision of a latch actuating and locking mechanism in which means are provided for selectively positioning a transmitting member either in a position to transmit movement of the push button or the like to the latch mechanism or withdrawing the transmit-

2 ting member to such a position that idling movement of the push button, ineffective to release the latch, is permitted; the provision of an improved actuating and locking unit particularly adapted for use with a tripper type latch mechanism; the provision of a push button operated latch actuating and locking mechanism in which manipulation of the key cannot operate the mechanism to release the latch; and the provision of a latch actuating and locking mechanism which may be economically manufactured and which will give trouble free service for long periods of time.

The above and other objects of my invention will appear from the following description of several embodiments thereof reference being had to the accompanying drawings in which:

Figure 12 is an elevational view of the apparatus shown in Figure 11, taken substantially on line 12—12 of Figure 11.

Figure 13 is an enlarged cross-sectional view of the latch actuating and locking unit of Figures 11 and 12, taken substantially on line 13—13 of Figure 12.

Figure 14 is an end elevation of the apparatus shown in Figure 13, taken substantially on line 14—14 of Figure 13.

Figure 15 is a cross-sectional view of the mechanism of Figure 13, taken substantially on line 15—15 of Figure 13 but illustrating the parts in locked or push button idling position.

Figure 16 is a fragmentary end elevation, taken substantially on line 16—16 of Figure 15, illustrating the outer end portion of the auxiliary support arm member.

Figure 17 is a detached side elevational view of the supporting base or housing member of the embodiment shown in Figure 11.

Figure 18 is a plan view of the base or housing shown in Figure 17.

Figure 19 is an end elevation of the base or housing shown in Figure 17.

Figure 1:
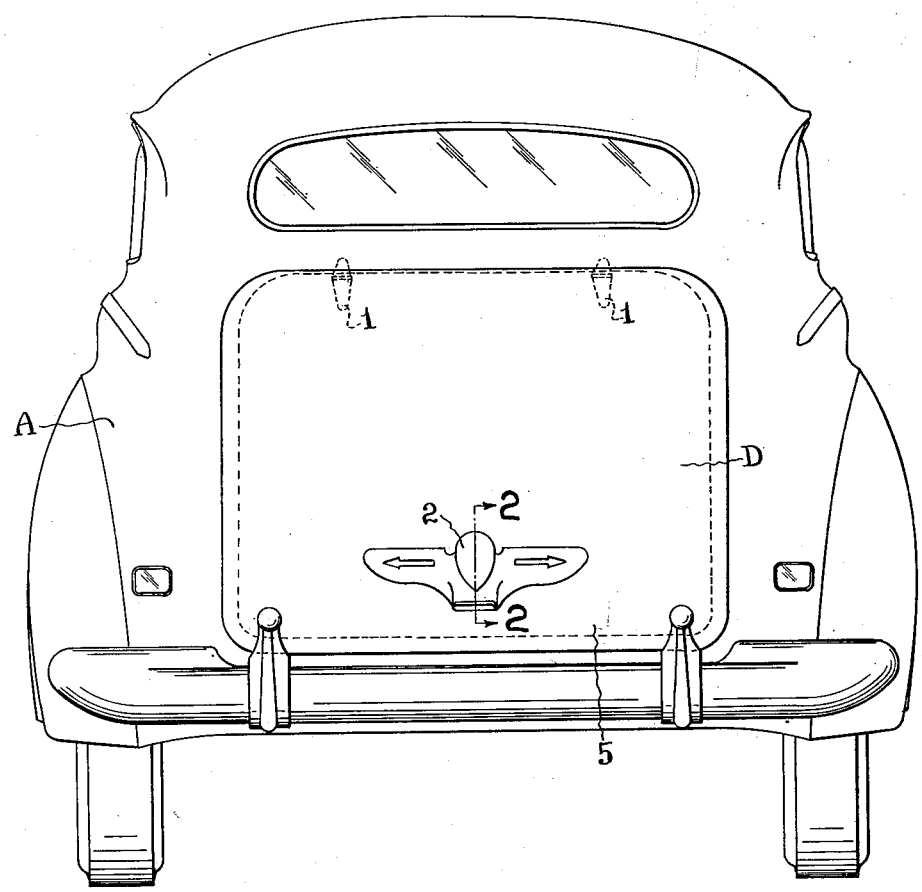
Figure 1 is an illustrative rear elevation of an automobile having the rear deck lid in which my improved latch actuating and locking mechanism is installed.
Figure 2:
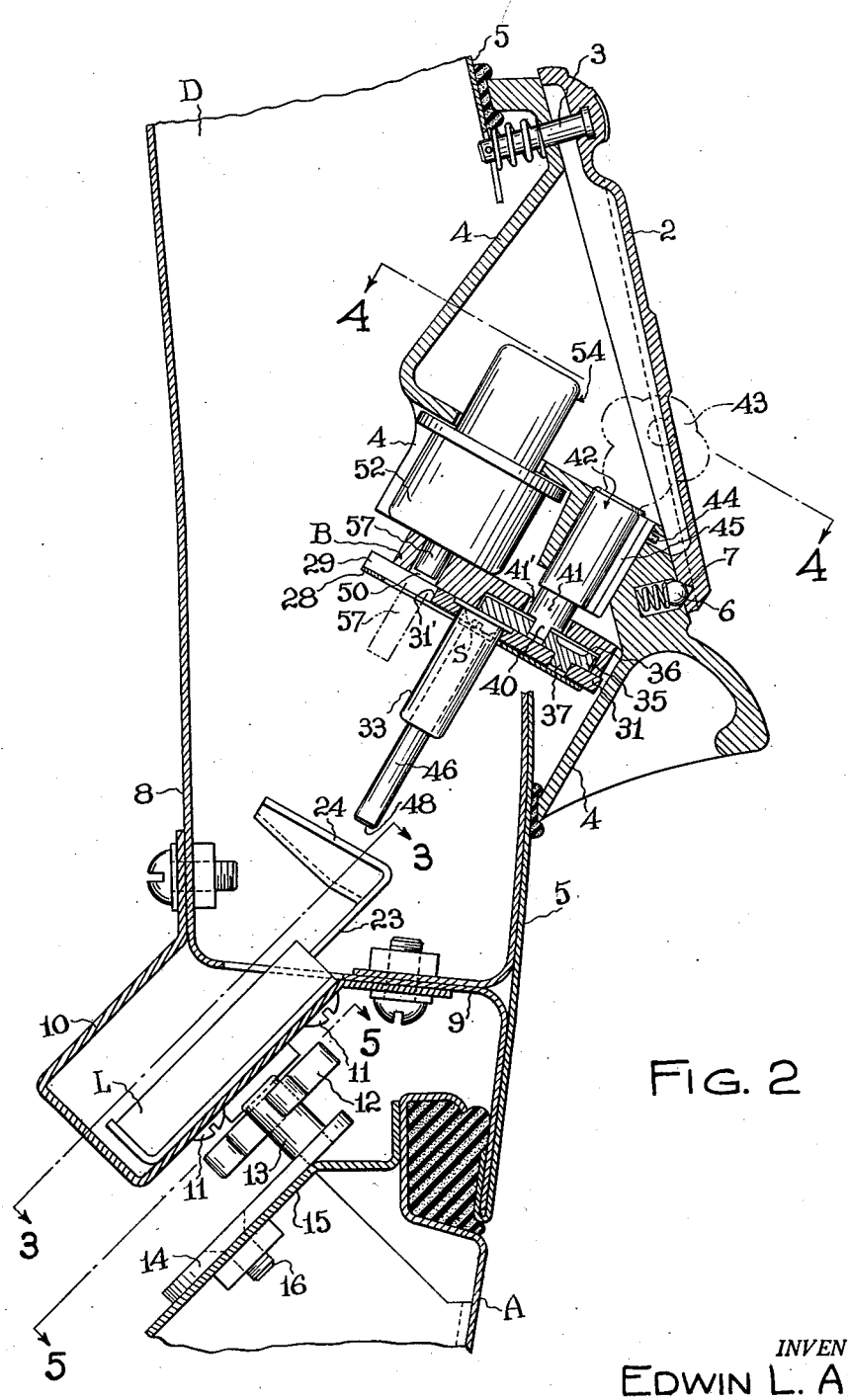
Figure 2 is an enlarged vertical cross-sectional view, taken substantially on line 2—2 of Figure 1, showing one embodiment of my latch actuating and locking mechanism installed at the lower edge of the deck lid in association with a latch mechanism of the tripper type, the actuating and locking mechanism being seen in locked or push button idling position.

The automobile shown in Figure 1 has a rear deck lid D, of usual form, hinged to the body A at its upper edge by hinges indicated at 1. A decorative housing, having a swinging lid or cover plate 2, is mounted adjacent the lower edge of the deck lid D. As is best seen in Figure 2, the cover plate 2 carries a pivot pin 3 which engages a suitable aperture in the supporting bracket 4 which forms a part of the decorative housing and is carried by the outer panel 5 of the deck lid D. A spring ball detent 6 cooperates with a suitable recess 7 in the cover plate 2 to retain the cover plate 2 in its closed position while permitting it to be swung about the pivot pin 3 to permit access to the latch actuating and locking mechanism as will later appear. Secured to the inner deck lid panel 8 and the bottom edge wall 9 thereof is a bracket member 10 to which the latch unit, generally indicated at L, is secured as by screws 11. As illustrated, the latch unit L includes a housing portion H which pivotally supports a bifurcated latch member 12 (see Figures 2, 3, and 5) which, when the deck lid is closed and latched, engages the keeper pin 13. This pin 13 is carried by a plate member 14 which is secured to a body reinforcing member 15 by screws 16.

Figure 3:
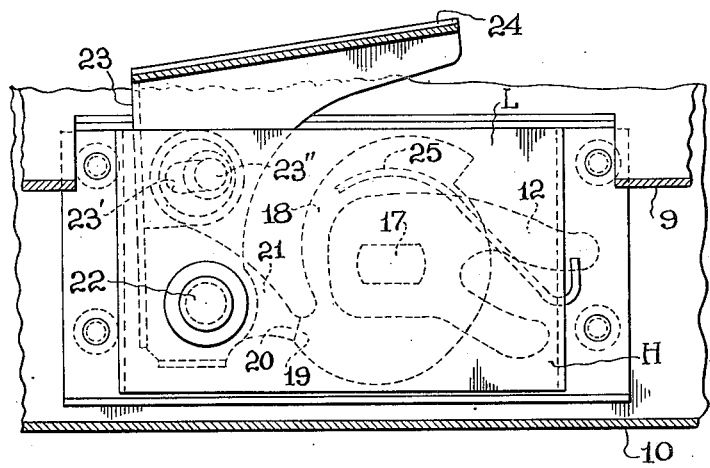
Figure 3 is a fragmentary cross-sectional view, taken substantially on line 3—3 of Figure 2, illustrating the essential parts of the tripper type latch mechanism with which my actuating and locking unit is associated.
Figures 4, 5:
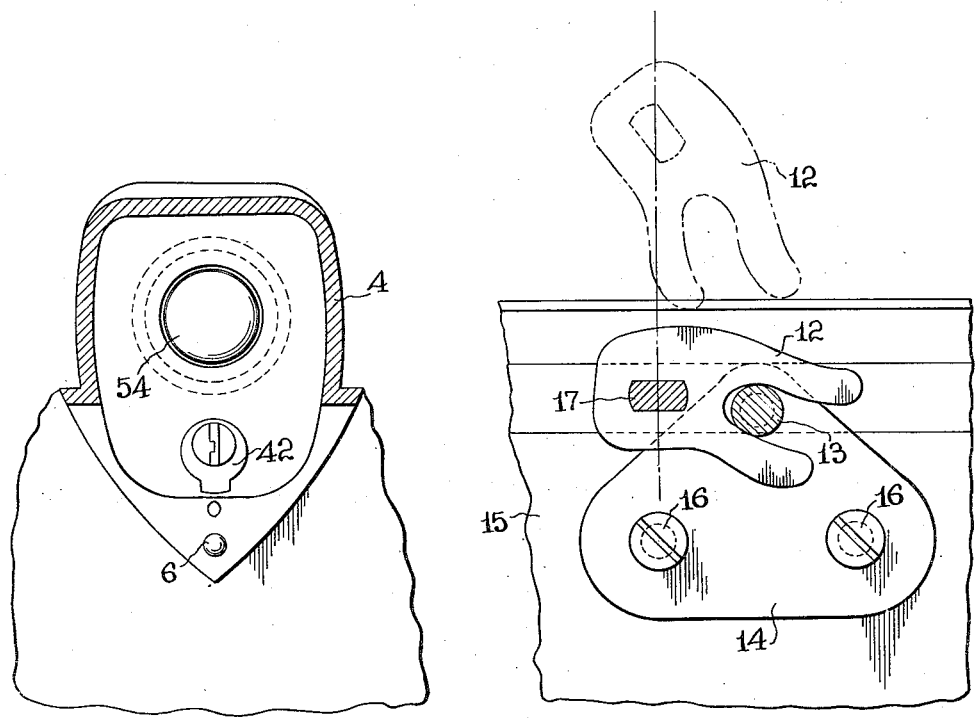
Figure 4 is a fragmentary cross-sectional view, taken substantially on line 4—4 of Figure 2, illustrating the outside appearance of the push button and key controlled lock when installed in a deck lid.
Figure 5 is a fragmentary cross-sectional view, taken substantially on line 5—5 of Figure 2, illustrating the movable latch member of the latch mechanism and the body supported fixed keeper pin therefor.

The latch member L is preferably of the tripper type and as illustrated embodies certain features disclosed in the Rudolph I. Schonitzer United States Patent No. 2,094,413 and my copending United States patent application Serial No. 746,521, filed May 7, 1947. As the latch mechanism per se does not constitute a part of the present invention it will be sufficient to point out that the bifurcated latch member 12 is pivotally mounted on a shaft 17 supported by the housing H. Also mounted on shaft 17 is the latch element 18 having an abutment portion 19 adapted to coact with an abutment portion 20 on the detent 21. The detent 21 is pivotally supported in the housing H on a pivot pin 22 and the operating arm or lever 23 is connected to the detent 21, extends upwardly out of the housing H, and is provided with a bent-over flange portion 24 which, as will appear later, is adapted to be engaged by my improved latch actuating and locking mechanism to effect release of the latch member L from its latched position seen in Figure 2 into its unlatched position as seen in phantom lines in Figure 5. Latch spring means, a portion of which is indicated at 25, tend to urge the latch member 12 in clockwise direction as seen in Figures 3 and 5 from its latched position to its unlatched position. When in latched position, as seen in Figure 3, the abutments 19 and 20 coact to retain the latch member 12 in latched position. Downward movement of the flange 24 of arm 23 from the position seen in Figure 3 will rotate the detent 21 in clockwise direction, causing the abutments 19 and 20 to be disengaged and permitting the latch element 18, shaft 17 and latch member 12 to rotate in clockwise direction to release the latch member from its engagement with the keeper pin 13, thus releasing the deck lid D. It will be understood that variations may be made in the particular form of latch mechanism illustrated herein and it will appear from the following description that my improved latch actuating and locking mechanism may be used with various types of closure latching devices.

Referring now particularly to Figures 2, 6, 7, 8, 9, and 10, my latch actuating and locking unit includes a base member, generally indicated at B, in the form of a substantially rectangular block to the underside of which is secured, by screws 26, a guideway forming plate 27. This plate 27 has a channel portion 28 forming an elongated slot or guideway 29 with the underside of base B and is also provided with an elongated aperture 30 for purposes which will appear later. Screws S (Figure 2) extend through holes S' in base B and secure the latch actuating and locking unit to the supporting bracket 4.

Figure 6:
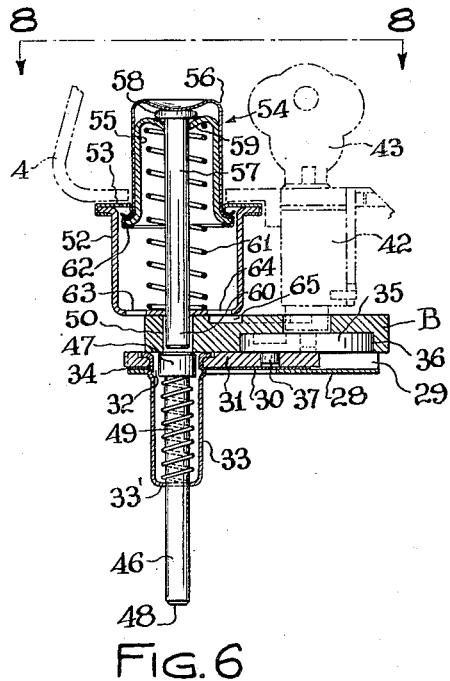
Figure 6 is a detached vertical cross-sectional view of the latch actuating and locking mechanism shown in Figure 2, the parts being illustrated in their unlocked or latch operating positions.
Figure 7:
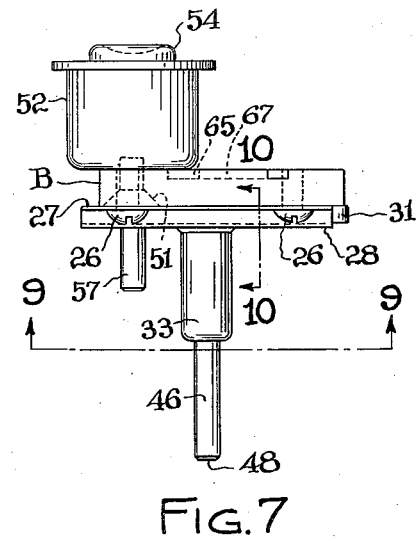
Figure 7 is a side elevational view of the mechanism shown in Figure 6, the parts however being shown in their locked positions and the push button idled into advanced position.
Figure 8:
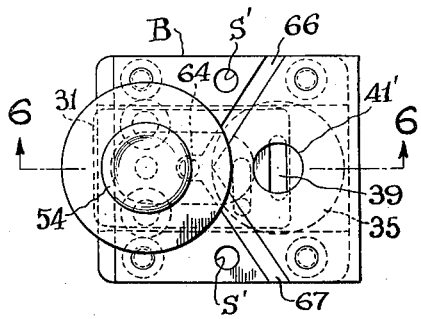
Figure 8 is a plan view taken substantially on line 8—8 of Figure 6.
Figure 9:
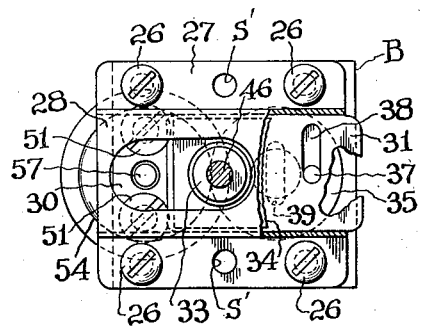
Figure 9 is a cross-sectional view, taken substantially on line 9—9 of Figure 7, with a portion of the base or housing cut away to illustrate more clearly the arrangement of the working parts.
Figure 10:
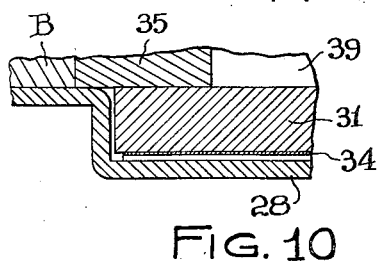
Figure 10 is an enlarged fragmentary cross-sectional view taken substantially on line 10—10 of Figure 7.

Slidably mounted in the slot or guideway 29 is an auxiliary support member 31 having a hole 32 adjacent one end. Projecting into hole 32 and crimped around the edges thereof as seen in Figure 6 is an elongated tubular inner plunger supporting member 33 which, as is clearly seen in Figures 2, 6, and 9 projects downwardly through the elongated slot 30 in the channel portion 28 of the plate 27. In order to provide a smooth sliding action of the auxiliary support member 31 in guideway 29 a flat thin brass or bronze leaf spring 34 (see Figures 6, 9 and 10) is preferably inserted between the lower face of auxiliary support 31 and the inner surface of channel portion 28 of guideway plate 27. It will be seen that the auxiliary support member 31 may have lineal sliding movement in guideway 29 between an advanced or unlocked position as seen in Figure 6 and a retracted or locked position as seen in Figures 2, 7, and 9.

In order to effect this sliding movement of auxiliary support 31 a disc member 35 is rotatably disposed in a correspondingly shaped circular recess 36 in the base member B. An eccentric pin 37 is carried by the disc 35 and projects downwardly into a transversely extending slot 38 in the auxiliary support member 31. As seen in Figure 2 the pin 37 and the auxiliary support 31 are in their maximum retracted or locked positions while in Figure 6 the disc 35 has been rotated through substantially 180° and the pin 37 and auxiliary support 31 are in their maximum advanced or unlocked positions. Slot 38 is disposed entirely on one side of the longitudinal center line of auxiliary support 31 (see Figure 9) and thus will permit rotation of disc 35 and pin 37 only in counterclockwise direction (Figure 9) and only through an angle of approximately 180°.

To effect the above described rotation of disc 35 and the accompanying advancing or retracting movement of the auxiliary support 31, the disc 35 has a centrally disposed slot 39 which, as best seen in Figure 2, is disposed in the generally rectangular driving end portion 40 of the plug 41 of a cylinder lock assembly generally indicated at 42. This cylinder lock 42 is mounted in a suitable aperture in the supporting bracket 4 and is of the type, well-known in the art, wherein the key 43 may only be inserted into or removed from the lock in one position of the plug 41. This position of the cylinder 41 is seen in Figure 2 of the drawings in which the auxiliary support 31 is in withdrawn or locked position and, as will appear more fully later, this arrangement of the cylinder lock, combined with the cooperative engagement of the pin 37 with the slot 38 of auxiliary support 31, permits insertion of the key 43 into the lock 42 only when the latch actuating and locking mechanism is locked, permits rotation of the key 43 only in one direction to unlock the mechanism, and requires that the key be turned back to its original locked position before it can be withdrawn. Cylinder lock 42 is retained in the bracket 4 by a retaining pin 44 and the projecting tumbler housing 45 acts as a key to prevent rotation of the barrel of cylinder lock 42 in the bracket 4 while permitting rotation of the plug 41 thereof upon turning of the key 43.

As is best seen in Figure 6, an inner plunger member 46 is slidably mounted in the tubular plunger support 33 for lineal movement in the direction of the plunger axis and has an enlarged head end portion 47 and an operating end portion 48. Surrounding the plunger 46 within the tubular member 33 is a compression spring 49 which engages the necked-in lower end 33' of tube 33 at its bottom end and the underside of head 47 at its upper end. This spring 49 tends to resiliently maintain the head 47 of plunger 46 in engagement with the underside of the base member B and it will be seen that when the auxiliary support 31 is moved between the locked position of Figure 2 and the unlocked position of Figure 6 the plunger 46 and its tubular support member 33 moves therewith.

A hole 50 extends through the base member B and is disposed opposite the head portion 47 of plunger 46 when the auxiliary support 31 and plunger 46 are in their advanced or unlocked positions (Figure 6). Secured to the upper surface of the base B, as by screws 51 (Figure 9), is an open ended cup shaped push button support and guide 52 having a relatively light metal bezel 53 crimped on to its open end. Slidably disposed in the opening in bezel 53 is the push button member 54 which is made up of an inner cup shaped portion 55 and an outer decorative cover 56. The upper end of cup 55 is apertured to receive the outer plunger 57 which has an enlarged head end 58 and is rigidly secured to the push button cup 55 as by crimping the edge 59 of the aperture in cup 55 around the plunger 57 immediately below the head 58. Thus the push button 54 and the plunger 57 form a unitary rigid assembly and the lower operating end 60 of outer plunger 57 extends down into the hole 50 in base B (see Figure 6) and is supported and guided for lineal movement in the direction of the plunger axis. In order normally to maintain the push button 54 and plunger 57 in their upper or retracted positions a compression spring 61 bears at its lower end against the closed bottom portion of the push button support 52 and at its upper end against the cup 55. As is seen in Figure 6, the lower end of cup 55 is flanged outwardly to provide an abutment portion 62 which engages the bezel 53 and limits outward movement of push button 54 and outer plunger 57.

In order to permit drainage of any water which might enter the push button supporting cup 52 between the bezel 53 and the push button 54, drain holes 63 and 64 are formed in the bottom of the cup 52, drain hole 64 being disposed in alignment with a recess or groove 65 in the outer face of base B. This recess 65 connects with drainage slots or troughs 66 and 67 (Figure 8) which will carry water to the sides of the base B and prevent it from entering the hole 41' into which the plug 41 of lock 42 extends.

The operation of the embodiment of my invention shown in Figures 1 to 10 inclusive will now be described. When the parts are in the positions shown in Figure 2 the deck lid D is closed and the latch member 12 is in latching engagement with the fixed keeper pin 13 thus holding the lid in closed position. The latch actuating and locking mechanism is in locked position with the auxiliary support 31 and inner plunger 46 in their retracted positions. Spring 49 maintains the head 47 of inner plunger 46 against the underside of base B and spring 61 maintains the push button 54 and outer plunger 57 in their non-operating or retracted positions. If, under the conditions illustrated and described, the cover plate 2 is opened and pressure is manually applied to the push button 54 it may be freely moved into the advanced position shown in Figure 7 during which movement the outer plunger 57 will move through the hole 50 in base B and the elongated aperture 30 in guideway plate 27 without any effect on the latch mechanism. This advanced idling position of plunger 57 is indicated in phantom lines in Figure 2. Upon release of pressure from the push button 54 it will return to its normal retracted position and it will be observed that push button 54 may be freely idled in and out at will without releasing the latch mechanism. If it is desired to release the latch to permit opening of the deck lid the key 43 is inserted in lock 42 and rotated through 180° during which rotation the pin 37 of disc 35 will have corresponding movement and will cause the auxiliary support member 31 to slide from its retracted or locked position as seen in Figure 2 into its advanced or unlocked position as seen in Figure 6. This movement of auxiliary support 31 will carry the inner plunger 46 substantially into axial alignment with the outer plunger 57 (see Figure 6). If the push button 54 is now depressed movement of the outer plunger 57 will cause the operating end 60 thereof to engage the head end 47 of inner plunger 46 and move inner plunger 46 inwardly against the spring 49 until the operating end 48 thereof engages the flange 24 on the latch operating arm 23, causing arm 23 to move detent 21 to effect disengagement of the abutments 19 and 20 and permit the latch member 12 to move from latched to unlatched position, thus releasing the deck lid from its latched engagement with the body. Release of push button 54 will, of course, permit spring 61 to return the push button and outer plunger 57 to their retracted positions and this movement of plunger 57 will permit spring 49 to return inner plunger 46 to its retracted position (as seen in Figure 6). If the deck lid is now closed the latch mechanism will automatically engage the keeper pin 13 on the body and latch member 12 will be rotated carrying with it the latch element 18 until abutment 20 of detent 21 can again move into latched position as seen in Figure 3 under the influence of a detent spring (not shown) which exerts a force urging detent 21 and arm 23 in counterclockwise direction as seen in Figure 3. It will also be noted that movement of detent 21 and arm 23 is limited in both directions by a slot 23' in arm 23 and a pin 23" carried by the latch housing H.

To lock the deck lid against unauthorized opening after closing and latching thereof it is only necessary for the operator to turn the key 43 back to its original position as seen in Figure 2. This movement of the key causes corresponding rotation of the lock plug 41 through substantially 180° and the accompanying rotation of disc 35 and movement of pin 37 in slot 38 in the auxiliary support 31 will retract auxiliary support 31 in the guideway 29 until the end 31' of auxiliary support 31 clears the hole 50 in base B (see Figure 2). As previously explained, the lock unit 42 is such that key 43 can only be removed when in the position just described. When the auxiliary support 31 is retracted into its locked position outer plunger 57 and push button 54 may be idled at will without releasing the latch mechanism. The length of the inner plunger 46 may of course be varied to suit the requirements of different installation conditions. By providing independent inner and outer plungers supported for axial movement in substantially the same direction, and by providing means for moving the inner plunger into or out of axial alignment with the outer plunger, an effective, easy operating, economical and trouble-free latch actuating and locking unit is provided.

In Figures 11 to 19 inclusive I have illustrated a second embodiment of my invention in which the auxiliary support member is mounted for swinging movement between an advanced or unlocked position and a retracted or locked position.

Figure 11:
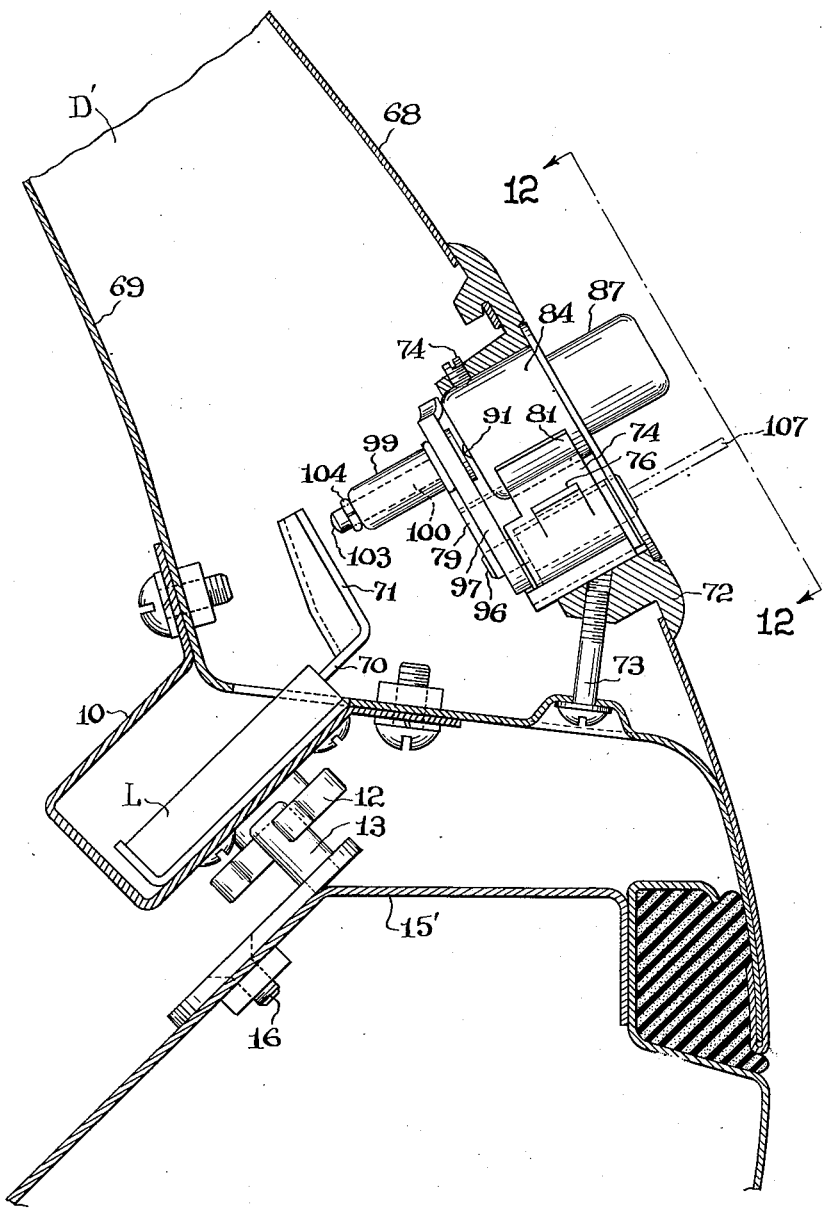
Figure 11 is a vertical cross-sectional view, generally similar to Figure 2 but illustrating a modified form of my improved latch actuating and locking mechanism, the parts being shown in their unlocked or operating positions.

In Figure 11 the rear deck lid D' has a slightly different form from the deck lid D previously described but includes the usual outer panel 68 and inner panel 69. The latch mechanism L may be substantially identical with that previously described and includes the latch member 12 adapted to engage the fixed keeper pin 13 secured to the body reinforcement member 15'. The latch L is mounted on the bracket 10 and the operating arm or lever 70 performs the same function as arm 23 shown in Figure 2. The angle flange portion 71 of arm 70 is bent to extend substantially normal to the direction of movement of the inner plunger 100 of the latch actuating and locking mechanism and it will, of course, be understood that various body designs may require modifications in the form and location of the parts of the latch L.

A mounting plate or bezel 72 is disposed in an aperture formed in the outer panel 68 of rear deck lid D' and is held in place by retaining screw 73. This bezel is recessed to receive the latch actuating and locking unit and a set screw 74 is employed to hold the unit in place. The base or housing member, generally indicated at B', of the embodiment illustrated in Figures 11 to 19 is preferably formed of sheet metal (see Figures 17 to 19) and comprises a pair of spaced side wall portions 74 and 75 having tangs 76 and 77 bent inwardly to form a lock receiving recess. Side walls 74 and 75 are connected at their lower ends by a web portion 78 and an end wall portion 79 extends at right angles from side wall 75 across one end of base B' to form an open sided slot 80 (see Figure 18) for receiving the auxiliary support member as will later appear.

At the upper ends of side walls 74 and 75 of base B' are flared out flanges 81 and 82, preferably formed with welding projections 83 to facilitate attaching of the push button supporting cup 84, and it will be seen that when the cup 84 is welded to the base B' a unitary assembly is provided. A cover plate 85 is apertured at 86 (Figure 13) to receive the push button 87 which is a cup shaped member generally similar to push button 54. The outer plunger 88 has an enlarged head 89 which may be welded or otherwise secured to the closed end of push button 87 and extends through and has a bearing in a central aperture in the closed end 84' of push button support cup 84. Compression spring 90 bears at one end against the bottom 84' of push button supporting cup 84 and at its opposite end against the inner surface of the outer end of push button 87 and thus tends at all times to maintain the push button 87 and outer plunger 88 in their retracted positions as seen in Figure 13. Outward movement of push button 87 is limited by a flange 87' formed on its open end which flange engages the cover plate 85 when the push button 87 is in fully retracted position. The operating end 91 of outer plunger 88 is disposed substantially in alignment with the end portion 84' of cup 84 when push button 87 is fully retracted (Figure 13).

A cylinder lock unit 92, preferably similar in its general arrangement and mode of operation to that previously described, is supported in the base B' by the side walls 74 and 75 and the tangs 76 and 77. The locking pin 93 projects from the body of lock 92 into a hole 94 in base B' to prevent removal of the lock from the housing.

As is best seen in Figure 13, the rotatable plug 95 of lock 92 has a flattened projecting end portion 96 which extends into a corresponding aperture in the auxiliary support arm 97 and forms a pivotal support therefor. It will be noted from Figures 13 and 19 that the end wall 79 of base B' is cut away at 98 to permit the end 96 of the lock plug 95 to extend through auxiliary support arm 97. Secured at the outer end portion of auxiliary support 97 is an open ended tubular supporting member 99 for the inner plunger 100 which projects through a hole 101 in the outer end of support 99 and has an enlarged head end portion 102 having a free sliding fit within the tubular member 99. To securely attach the tubular member 99 to the auxiliary support arm 97 it may be crimped and flared into a suitable aperture in arm 97 as is clearly shown in Figure 13.

The operating end 103 of plunger 100 projects out of sleeve 99 and a shoulder 104, which may be formed of wire crimped into a suitable groove in plunger 100, restricts the retracting movement of plunger 100 so that the head end 102 does not project beyond the open end of support sleeve 99. To normally urge plunger 100 in retracting direction (to the right in Figure 13) a compression spring 105 is employed. This spring abuts the outer end of tubular support 99 at one end and the underside of head 102 of plunger 100 at its opposite end and normally holds the plunger 100 with the abutment 104 engaging the end of tubular support 99.

In order to provide the desired action of the auxiliary support arm 97 it is adapted to fit between the inner face of end wall 79 of base B' and the edge portion 74' (see Figure 18) of side wall 74 of base B'. A thin flat bronze spring 106 (Figure 13) may be disposed between the inner face of end wall 79 and the outer face of auxiliary support arm 97 to provide the desired smooth operating frictional engagement therebetween. This spring 106 is preferably secured to the end wall 79 so that it does not move with the auxiliary arm 97.

From the above description it will be seen that when a key, indicated in phantom lines at 107, is inserted in the lock 92 turning of the key will cause rotation of the key cylinder 95 and the flattened end portion 96 thereof. As the auxiliary support arm 97 is carried by the end portion 96, rotation of the plug 95 will cause corresponding angular rotational movement of the auxiliary support arm 97 about the axis of plug 95 as a center. As seen in Figure 11 the parts are in advanced or unlocked position wherein inward movement of the push button 87 will cause corresponding inward movement of outer plunger 88. During such movement the operating end 91 of outer plunger 88 engages the head end 102 of inner plunger 100 and moves the operating end 103 thereof into engagement with flange 71 of operating arm 70 to release the latch L and permit opening of the deck lid D'. When the parts are in unlocked position the inner plunger 100 and the outer plunger 88 are substantially in axial alignment and it will be noted that both plungers are supported for movement in the same direction and that each plunger is normally urged in the same (retracting) direction by its spring.

When it is desired to lock the deck lid to prevent unauthorized opening thereof it is only necessary to turn the key 107 through 90° which will rotate the auxiliary support arm 97 from the position seen in Figures 11 and 13 into the retracted or locked position seen in Figure 15. When in this position the plunger 100 and the support arm 97 are completely out of alignment with and removed from the path of outer plunger 88. Accordingly idling in and out movement of push button 87 is permitted without unlatching the latch mechanism. The lock 92 is preferably of the type in which the key 107 can only be removed in one position of the auxiliary support arm 97, namely the retracted or locked position seen in Figure 15.

When it is desired to open the closed and locked deck lid D' the operator inserts his key into lock 92 and turns it through 90° to swing the support arm 97 up into unlocked position placing the inner plunger 100 in alignment with the outer plunger 88. Upon pressing on the push button 87 the operating end 91 of outer plunger 88 is caused to engage the head end 102 of inner plunger 100 with resulting movement thereof to engage the latch mechanism and release the latch.

From the above description of two embodiments of my invention it will be seen that I have provided a free acting, rugged and effective latch actuating and locking unit which may readily be accommodated to various installation requirements. The inner plunger in both embodiments of my invention constitutes in effect a transmitting member, supported for movement into and out of transmitting position, whereby movement of the manually operable push button may be transmitted to the latch mechanism to effect release thereof. By mounting the key controlled lock unit independently of the manually operable push button the key can be inserted into the lock for locking purposes without exerting any pressure whatever on the push button. This feature is advantageous because in some cases dirt or other foreign matter may become lodged in the key hole necessitating considerable force to push the key into operating position. If the lock were embodied in the push button proper this might result in undesired inward movement of the push button which would cause release of the latch when the operator desired to lock the door.

Although I have described the illustrated embodiments of my invention in considerable detail it will be understood that variations and modifications may be made in the form, arrangement, and proportions of the parts and I do not therefore wish to be limited to the specific structures herein shown and described but claim as my invention all embodiments thereof coming within the scope of the appended claims.

I claim:

1. In a latch actuating and locking mechanism, a base member, an auxiliary support carried by said base member for movement relative thereto between an advanced or unlocked position and a retracted or locked position, an outer plunger movably supported on said base for lineal in and out movement relative thereto, a tubular inner plunger support carried by said auxiliary support, an inner plunger movably supported by said tubular support for lineal in and out movement relative thereto in substantially the same direction as the movement of said outer plunger, independent spring means associated with each of said plungers for urging them in the same direction relative to said base, said plungers being substantially axially aligned when said auxiliary support is in said advanced or unlocked position and being completely out of alignment when said auxiliary support is in said retracted or locked posiiton, and means having operating connection with said auxiliary support for moving same between said advanced and retracted positions.

2. In a latch actuating and locking mechanism, a base member, an auxiliary support carried by said base member for movement relative thereto between an advanced or unlocked position and a retracted or locked position, an outer plunger movably supported on said base for lineal in and out movement relative thereto, a tubular inner plunger support carried by said auxiliary support, an inner plunger movably supported by said tubular support for lineal in and out movement relative thereto in substantially the same direction as the movement of said outer plunger, independent spring means associated with each of said plungers for urging them in the same direction relative to said base, said plungers being substantially axially aligned when said auxiliary support is in said advanced or unlocked position and being completely out of alignment when said auxiliary support is in said retracted or locked position, and key controlled means having operating connection with said auxiliary support for moving same between said advanced and retracted positions.

3. Door latch actuating and locking mechanism comprising a base member, a manually operable outer plunger supported by said base member for lineal movement inwardly and outwardly relative to said base member, said plunger having an operating end portion and a head end portion, spring means for urging said plunger in outward direction, means for limiting the lineal movement of said plunger in inward and outward directions, an auxiliary support member carried by said body member for limited movement relative thereto between an advanced or locked position and a retracted or unlocked position, an inner plunger having an operating end portion and a head end portion, said inner plunger being mounted on said auxiliary support member for lineal movement inwardly and outwardly relative thereto, spring means for urging said inner plunger in outward direction, means for limiting the lineal movement of said inner plunger in inward and outward directions, said auxiliary support member, when in said unlocked position, being adapted to support said inner plunger substantially in axial alignment with said outer plunger with the head end portion of said inner plunger adjacent the operating end portion of said outer plunger and, when in locked position, to support said inner plunger out of axial alignment with said outer plunger and permit unobstructed idling movement of said outer plunger, and means having operating connection with said auxiliary support member for moving same from said locked position to said unlocked position and return.

4. Latch actuating and locking mechanism including a base having a guideway portion and a circular recess adjacent said guideway portion, an auxiliary support member carried by said base and guided by said guideway for lineal movement relative to said base, said auxiliary support having a slot extending thereinto, a disc member rotatably disposed in said circular recess in said base and having an eccentric pin projecting into said slot and operatively engaging said auxiliary support member whereby rotation of said disc will effect lineal movement of said auxiliary support between an advanced or unlocked position and a retracted or locked position, outer plunger supporting means on one side of said base, an outer plunger carried by said outer plunger supporting means for lineal movement transversely of the plane of movement of said auxiliary support, inner plunger supporting means on said auxiliary support, an inner plunger carried by said inner plunger supporting means for lineal movement in substantially the same direction as said outer plunger, said outer and inner plunger supporting means being disposed respectively on said base member and said auxiliary support so that said inner and outer plungers are substantially axially aligned when said auxiliary support is in advanced or unlocked position, said auxiliary support and inner plunger, when said auxiliary support is in retracted or locked position, being out of the path of movement of said outer plunger whereby idling movement thereof is permitted, and means having operating connection with said disc for rotating same to move said auxiliary support member between its said advanced and retracted positions.

5. Latch actuating and locking mechanism including a base having a guide way portion and a circular recess adjacent said guideway portion, an auxiliary support member carried by said base and guided by said guideway for lineal movement relative to said base, said auxiliary support having a slot extending thereinto, a disc member rotatably disposed in said circular recess in said base and having an eccentric pin projecting into said slot and operatively engaging said auxiliary support member whereby rotation of said disc will effect lineal movement of said auxiliary support between an advanced or unlocked position and a retracted or locked position, outer plunger supporting means on one side of said base, an outer plunger carried by said outer plunger supporting means for lineal movement transversely of the plane of movement of said auxiliary support, inner plunger supporting means on said auxiliary support, and inner plunger carried by said inner plunger supporting means for lineal movement in substantially the same direction as said outer plunger, said outer and inner plunger supporting means being disposed respectively on said base member and said auxiliary support so that said inner and outer plungers are substantially axially aligned when said auxiliary support is in advanced or unlocked position, said auxiliary support and inner plunger, when said auxiliary support is in retracted or locked position, being out of the path of movement of said outer plunger whereby idling movement thereof is permitted, and key controlled means having operating connection with said disc for rotating same to move said auxiliary support member between its said advanced and retracted positions.

6. In a latch actuating and locking mechanism, a base member, outer plunger supporting means on said base, an outer plunger carried by said outer plunger supporting means for lineal in and out movement relative to said base, an auxiliary support arm, means for pivotally supporting said auxiliary support arm for rotational movement relative to said base between an advanced or unlocked position and a retracted or locked position, inner plunger supporting means on said auxiliary support arm, an inner plunger carried by said inner plunger supporting means for lineal movement in substantially the same direction as said outer plunger, said outer and inner supporting means being disposed respectively on said base member and said auxiliary support so that said inner and outer plungers are substantially axially aligned when said auxiliary support arm is rotated into advanced or unlocked position, said auxiliary support and said inner plunger, when said auxiliary support is rotated into retracted or locked position, being out of the path of movement of said outer plunger, and means having operating connection with said auxiliary support for rotatably moving same between said advanced and retracted positions.

7. In a latch actuating and locking mechanism, a base member, outer plunger supporting means on said base, an outer plunger carried by said outer plunger supporting means for lineal in and out movement relative to said base, an auxiliary support arm, means for pivotally supporting said auxiliary support arm for rotational movement relative to said base between an advanced or unlocked position and a retracted or locked position, inner plunger supporting means on said auxiliary support arm, an inner plunger carried by said inner plunger supporting means for lineal movement in substantially the same direction as said outer plunger, said outer and inner supporting means being disposed respectively on said base member and said auxiliary support so that said inner and outer plungers are substantially axially aligned when said auxiliary support arm is rotated into advanced or unlocked position, said auxiliary support and said inner plunger, when said auxiliary support is rotated into retracted or locked position, being out of the path of movement of said outer plunger, and key controlled means having operating connection with said auxiliary support for rotatably moving same between said advanced and retracted positions.

8. In a latch actuating and locking mechanism, a base member, outer plunger supporting means on said base, an outer plunger carried by said outer plunger supporting means for lineal in and out movement relative to said base, a cylinder lock carried by said base and having a key controlled rotatable plug portion, an auxiliary support arm operatively connected to said lock plug for rotational movement therewith between an advanced or unlocked position and a retracted or locked position, inner plunger supporting means carried by said auxiliary support arm, and an inner plunger carried by said inner plunger supporting means for lineal movement in substantially the same direction as said outer plunger, said outer and inner plunger supporting means being disposed respectively on said base member and said auxiliary support so that said inner and outer plungers are substantially axially aligned when said auxiliary support is rotated into advanced or unlocked position, said auxiliary support and said inner plunger, when said auxiliary support is rotated into retracted or locked position, being out of the path of movement of said outer plunger.

9. In a latch actuating and locking mechanism, a base member, an auxiliary support carried by said base member for movement relative thereto between an advanced or unlocked position and a retracted or locked position, an outer plunger movably supported on said base for lineal in and out movement relative thereto, an inner plunger movably supported on said auxiliary support for lineal in and out movement relative thereto in substantially the same direction as the movement of said outer plunger, spring means associated with said plungers for urging them in the same direction relative to said base member, said plungers being substantially axially aligned when said auxiliary support is in said advanced or unlocked position and being out of engaging alignment when said auxiliary support is in said retracted or locked position, and means having operating connection with said auxiliary support for moving same between said advanced and retracted positions.

EDWIN L. ALLEN.

REFERENCES CITED

The following references are of record in the file of this patent:

UNITED STATES PATENTS

| Number | Name | Date |
| --- | --- | --- |
| 2,135,759 | Mabee | Nov. 8, 1938 |
| 2,218,183 | Springer | Oct. 15, 1940 |
| 2,231,075 | Lakin | Feb. 11, 1941 |